Patented Mar. 24, 1942

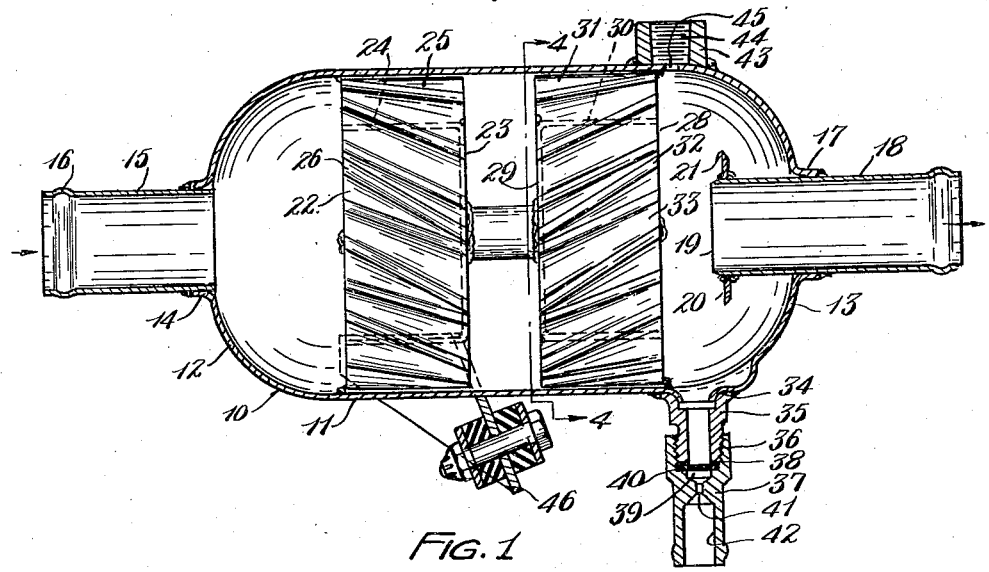

2,277,646

UNITED STATES PATENT OFFICE 2,277,646

OIL SEPARATOR

James P. Johnson, Shaker Heights, Ohio, assignor to Pump Engineering Service Corporation, Cleveland, Ohio, a corporation of Ohio Application May 13, 1939, Serial No. 273,569

4 Claims. (Cl. 183—110)

This invention relates to oil separators and more particularly to one designed especially for use on aircraft although the novel features may be otherwise adapted by those skilled in the art.

An object of the present invention is to provide an oil separator of compact light weight construction, highly efficient in the separation of oil and one which has no movable parts thus eliminating wear and replacements.

Another object of the present invention is to impart a swirling motion to the oil ladened air in one direction to effect liberation of some of the oil particles and foreign matter and to then impart a further swirling motion to the oil ladened air in the opposite direction to effect liberation of practically all of the remaining oil particles, thus producing a clean air for the purpose intended.

Another object of the present invention is to provide an oil separator which is simple in construction, efficient in operation and inexpensive to manufacture.

With the objects above indicated, and other objects hereinafter explained in view, my invention consists in the construction and combination of elements hereinafter described and claimed.

Referring to the drawing,

Figure 1 is a longitudinal sectional view of an oil separator embodying the present invention and taken on line 1—1 in Figure 3.

Figure 2 is a bottom plan view of the separator shown in Figure 1 and disclosing the attaching means.

Figure 3 is an end elevational view looking inwardly from the right of Figure 1.

Figure 4 is a transverse vertical sectional view taken along line 4—4 in Figure 1 and showing details of one of the baffle members.

In the drawing I have illustrated an oil separator embodying features which make it much more efficient in the separation of oil from oil ladened air than the oil separator disclosed in my copending application, Serial No. 250,431, filed January 11, 1939, which issued as Patent No. 2,227,501 on January 7, 1941, and over which the present invention is a decided improvement. While the separation obtained by the oil separator of my copending application is extremely high and satisfactory in many instances, the presence of any oil in the air used for inflating the rubber tubes of de-icer equipment has a very deteriorating effect upon the rubber. The preferred arrangement of the separator shown in the accompanying drawing results in a much higher separating efficiency due principally to the swirling movement which is imparted to the oil ladened air, whereby the discharged air is so freed of oil particles that deterioration upon the rubber is reduced to a negligible factor.

The separator comprises a hollow fluid tight housing indicated generally by the numeral 10 having a tubular shaped body portion 11 and cup shaped end walls 12 and 13 preferably formed from aluminum sheet material and welded. The end wall 12 has a central opening surrounded by a flange 14 through which one end of an inlet tube 15 projects and is securely welded to the flange, the opposite end of the tube 15 projecting outwardly a suitable distance being adapted for connection with the discharge side of a vacuum pump in a manner well known. The outer end of the tube 15 is provided with a circumferential ridge 16 to assist in maintaining suitable connection with the discharge line.

The end wall 13 of the housing is likewise provided with a circular opening surrounded by a flange 17 through which one end of an outlet tube 18 projects, the flange and adjacent portion of the tube being welded or otherwise suitably sealed. In this instance the inner end of the tube 18 projects inwardly beyond its connection with the flange 17 and its inner edge 19 is sharpened for a purpose to be later described. Adjacent the inner end of the tube 18 is a deflector plate 20 which projects laterally outwardly and has its outer edge sharpened at 21 for a purpose to be later described. The deflector plate 20 is secured to the inner end of the tube 18 by welding or any other suitable means of connection. The outer end of the tube 18 is shaped similarly to the outer end of the tube 15 and is adapted for connection with the inlet side of a de-icer equipment or other instrumentality actuated by the cleaned air as discharged from the end of the tube 18.

As the oil ladened air passes through the inlet tube 15 and to the interior of the housing, it has been found that to impart a swirl thereto materially assists the separation of the oil and air. While any desirable means may be used for imparting this swirling motion, the baffle arrangement shown in the drawing has proven very efficient and is desirable particularly in view of its simplicity and the fact that it embodies no movable parts. The baffle indicated generally by the numeral 22 comprises an end wall 23 disposed transversely within the tubular shaped body portion 11 coaxially of the inlet tube 15 and has an outwardly extending marginal flange 24 in spaced relation with respect to the inner adjacent wall of the body portion 11. A corrugated member 25 is disposed between the flange 24 and the adjacent inner wall of the body portion 11 and preferably is coextensive with the length of the flange 24. The corrugated member 25 extends entirely around the flange 24 as more clearly shown in Figure 4 and has its ridges 26 and intervening grooves 27 angularly disposed with reference to the axis of the inlet tube 15. To secure the baffle in place the flange 24 is welded or otherwise secured to adjacent portions of the corrugated member 25 while the latter is likewise welded to the inner wall of the body portion 11. In this particular instance it is only necessary to weld at desirable points to obtain the necessary rigidity. It will be seen that the ridges and grooves are so arranged on the baffle member 22 as to effect a swirling of the incoming oil ladened air in a clockwise direction for a purpose to be later described although this is not of importance and may be so arranged as to impart a swirling action in the opposite direction if desired.

A second baffle member 28 is substantially the same in structure as the baffle member 22 heretofore described, the main difference being that the end wall 29 is arranged in parallel spaced relation with respect to the end wall 23 and the flange 30 extends outwardly or in the direction of the outlet opening. The corrugated member 31 has ridges 32 and intervening grooves 33 disposed in angular relation with respect to the excess of the inlet tube 18 and in diverging relation with respect to the ridges 26 of the baffle member 22. It will be seen that by reversing the arrangement of the ridges and grooves on the baffle 32 the oil ladened air leaving the baffle 22 will have imparted to it a swirling motion in the opposite direction or in a counterclockwise direction which further assists in separating the oil particles from the air. A single baffle may be used instead of the two shown in the drawing and a marked advantage is observed. By utilizing a pair of baffle members, however, in the relation shown a greater degree of separation is obtained. If a still higher degree of separation is required as many additional baffle members may be employed as is desired, the arrangement of adjacent baffles preferably being in the relation of those shown in the drawing. The efficiency of the separator will be readily apparent when it is appreciated that the drawing illustrates the baffle in about ⅝ of its actual size and the high efficiency which can be obtained by merely an elongation of the housing without any increase in its diameter.

To recover the separated oil and to return it to the engine crank-case or other reservoir, the end 13 at its bottom and beyond the baffle 32 is provided with an opening having an outwardly extending annular flange 34 to which is secured an oil outlet tube 35 having an exteriorly screwthreaded end 36, the tube 35 being connected to the flange by brazing or soldering as desired. A nipple 37 has a bore at one end screwthreadedly mounted upon the threaded end of the outlet tube and a gasket 38 for sealing the connection therebetween. The nipple is provided with a bore 39 to receive a strainer 40 extending transversely across the open end and held in place by the gasket 38. The nipple is also provided with an axial opening 41 of restricted diameter which communicates on one side with the outlet opening and on the opposite side with an outlet bore 42 of larger diameter. To the free end of this nipple 37 a conduit is attached which connects with the engine crank-case or other oil reservoir. It is important that this outlet tube 35 always point downwardly and that the separator has a slight declining position from the inlet opening to the outlet opening to insure that the oil particles separated from the air will flow towards the oil outlet opening 35.

If desirable the interior of the separator may be connected with a pressure gauge to determine the fluid pressure therein so as to eliminate excessive pressure. In this instance the housing has an extension 43 brazed or soldered to the outside thereof preferably diametrically opposite from the oil tube 35. The extension 43 is provided with an interiorly screwthreaded bore 44 which communicates with a bore 45 in the adjacent wall of the separator and affording communication with the interior thereof. This extension can be connected with a pressure gauge or if a pressure gauge is not desirable the opening may be closed by the use of a screwthreaded plug not shown.

The separator is adapted for suitable mounting and has an attaching bracket 46 which extends beneath the housing 11 and is provided with a pair of flanges 47 on opposite sides thereof, the flanges being connected to the opposite sides of the housing by welding or other suitable connecting means. The attaching bracket 46 is preferably disposed at an angle which, when connected to the structure on which it is to be mounted, the separator will extend at a declining angle from the inlet opening to the outlet opening of approximately 15 degrees above horizontal when the plane is in flying condition.

In the operation of the device the inlet tube 15 is connected to the discharge side of a vacuum pump whereby the discharged oil ladened air is introduced into the inlet opening 15 under considerable pressure. The introduced oil ladened air spreads as it passes the inner end of the tube 15 and is forced through the baffle member 22, the oil ladened air passing between the ridges and grooves of the corrugated member 25 which, being angularly disposed, imparts a swirling movement to the oil ladened air in a clockwise direction. This causes the air to swirl and the heavier oil particles are thrown outwardly into the space between the adjacent baffles. The swirling oil ladened air is then forced through the baffle 32, the oil ladened air passing between the ridges and grooves of the corrugated member 31 and these ridges and grooves being arranged in a reverse direction effects a swirling movement of the oil ladened air in a reverse direction. As the oil ladened air passes beyond the baffle 32 the tremendous swirling action causes the oil particles to be thrown against the inner wall of the separator and this being a rounded surface the oil particles flow down and out through the oil tube 35. The oil freed air passes through the outlet tube 18 and is conveyed to the de-icer equipment or other mechanism to be operated by the clean air. While it is true that all of the oil in the discharged air has not been removed tests have shown, however, that due to the construction and arrangement of the baffles the efficiency of the oil separator runs above 95 percent. It will be seen that such a small percentage of oil remaining will not have any material deteriorating effect upon the rubber of the de-icer tubes. As has further been explained a higher degree of separation can be effected by providing additional baffles. The deflector plate which is mounted upon the inner end of the outlet tube 18 is to direct any oil which accumulates on the inner end of the tube causing it to run by gravity down the deflector plate and the latter having a sharpened edge offers no resistance to its dropping.

While I have described the preferred embodiment of the invention it is to be understood that I am not to be limited thereto inasmuch as changes and modifications may be resorted to without departing from the spirit of the invention as defined in the appended claims.

What is claimed is:

1. A separator for removing oil from oil ladened air including a closed cylindrical housing having converging end wall portions communicating respectively with a tubular inlet for oil ladened air and a tubular outlet for oil freed air, means in said housing adjacent and below the said air outlet for removing oil therefrom, and means interposed between said inlet and said outlet effective to produce swirling and changes in the direction of flow of said oil ladened air whereby the resulting forces are effective to cause the oil to separate from the air, said means comprising a plurality of axially spaced tubular members of a diameter less than the inside diameter of said cylindrical housing, each having a transverse wall preventing passage therethrough of oil and air, the outer periphery of each of said tubular members being spaced radially inwardly of the inner wall of said housing, thus forcing the oil and air to all pass between the outer periphery of each of said tubular members and the wall of said housing, corrugated members positioned between said tubular members and the inner periphery of said housing, the ridges of said corrugations being inclined with respect to the axis of said cylinder, said corrugated ridges on adjacent tubular members being inclined in opposite directions relative to the axis of said housing.

2. A separator for removing oil from oil ladened air including a closed cylindrical housing having converging end walls communicating respectively with a tubular inlet for oil ladened air and a tubular outlet for oil freed air, means adjacent and below said air outlet for removing separated oil from said housing, and means interposed between said inlet and said outlet effective to produce swirling and changes in the direction of flow of said oil ladened air whereby the resulting forces are effective to cause the oil to separate from the air, said means comprising a plurality of axially spaced tubular members having an outside diameter less than the inside diameter of the cylindrical portion of said housing, each of said tubular members having a transverse wall preventing passage of oil and air therethrough, thus forcing the oil and air to all pass between the outer periphery of each of said tubular members and the walls of said housing, a plurality of generally circular corrugated strips corresponding in number to said tubular members, one of said corrugated strips positioned between each tubular member and said housing wall, the inner ridges of said corrugated strips engaging the outer wall of the corresponding tubular member while the outer ridges engage the inner wall of said housing, said ridges being inclined to the axis of said cylinder, said ridges on said adjacent corrugated members being inclined in opposite directions to the axis of said housing.

3. A separator for removing oil from oil ladened air including a closed cylindrical housing having converging end wall portions communicating respectively with a tubular inlet member for oil ladened air and a tubular outlet member for oil freed air, means adjacent and below said air outlet for removing oil from said housing, and means interposed between said inlet and said outlet effective to produce swirling and changes in the direction of flow of said oil ladened air whereby the resulting forces are effective to cause the oil to separate from the air, said means comprising a plurality of axially spaced tubular members having an outside diameter less than the inside diameter of the cylindrical portion of said housing, adjacent ends of said tubular members being closed by transverse walls preventing the passage of oil and air through said tubular members, thus forcing the oil and air to pass between the outer periphery of each of said tubular members and the wall of said housing, means fixing said tubular members in definite spaced relation, and centrally of said walls, said means including a plurality of generally circular strips of corrugated sheet metal corresponding in number to said tubular members, one positioned between each tubular member and said housing wall, the inner ridges of said corrugated members engaging the outer wall of the corresponding tubular member while the outer ridges engage the inner wall of said housing, said ridges being inclined to the axis of said cylinder, said ridges on adjacent corrugated members being inclined in opposite directions to the axis of said housing.

4. A separator for removing oil from oil ladened air including a closed cylindrical housing having converging end wall portions communicating respectively with a tubular inlet member for oil ladened air and a tubular outlet member for oil freed air, means adjacent and below said air outlet member for removing oil from said housing, and means interposed between said inlet and said outlet effective to produce swirling and changes in the direction of flow of said oil ladened air whereby the resulting forces are effective to cause the oil to separate from the air, said means comprising a plurality of axially spaced tubular members having an outside diameter less than the inside diameter of the cylindrical portions of said housing, said tubular members each having a transverse wall to prevent the passage of oil and air therethrough, thus forcing the oil and air to all pass between the outer periphery of each of said tubular members and the wall of said housing, corrugated sheet metal members embracing said tubular members and spacing the same radially inwardly of said housing wall, said tubular outlet member being particularly characterized by the fact that a portion thereof extends axially inwardly of said housing and is formed with a sharp inner terminal periphery, said inwardly extending portion being further provided with a radially outwardly extending embracing washer-like flange formed with a sharp peripheral portion, said flange being positioned axially away from said sharp inner terminal periphery of said tubular member to thus expose said sharp terminal periphery to the air passing thereover.

JAMES P. JOHNSON.